United States Patent
Holbrook et al.

(10) Patent No.: US 10,778,721 B1
(45) Date of Patent: *Sep. 15, 2020

(54) HASH-BASED ACL LOOKUP OFFLOAD

(71) Applicant: Arista Networks, Inc., Santa Clara, CA (US)

(72) Inventors: Hugh W. Holbrook, Palo Alto, CA (US); Francois Labonte, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/272,083

(22) Filed: Sep. 21, 2016

Related U.S. Application Data

(60) Provisional application No. 62/300,389, filed on Feb. 26, 2016.

(51) Int. Cl.
  *H04L 29/06* (2006.01)
  *G06F 16/901* (2019.01)

(52) U.S. Cl.
  CPC .......... *H04L 63/20* (2013.01); *G06F 16/9014* (2019.01); *G06F 16/9017* (2019.01); *H04L 63/101* (2013.01)

(58) Field of Classification Search
  CPC . H04L 63/20; H04L 63/101; G06F 17/30949; G06F 17/30952
  See application file for complete search history.

(56) References Cited

U.S. PATENT DOCUMENTS

| | | | |
|---|---|---|---|
| 6,757,742 B1 | 6/2004 | Viswanath | |
| 7,002,965 B1 * | 2/2006 | Cheriton | H04L 45/00 370/395.32 |
| 7,249,228 B1 * | 7/2007 | Agarwal | G06F 21/6218 370/395.7 |
| 7,324,514 B1 * | 1/2008 | Haq | H04L 12/66 370/392 |
| 7,657,706 B2 | 2/2010 | Iyer et al. | |
| 8,621,211 B1 * | 12/2013 | Kishore | H04L 63/20 713/168 |
| 8,689,284 B2 * | 4/2014 | Roberts | G06F 21/31 726/1 |

(Continued)

OTHER PUBLICATIONS

U.S. Appl. No. 13/852,863, filed Mar. 28, 2013, titled "System and Method for Access Control List Conversion", by inventors Adam James Sweeney and Asang Kamalakar Dani, 30 pages (specification and drawings).

(Continued)

*Primary Examiner* — Mohammed Waliullah
(74) *Attorney, Agent, or Firm* — Haley Guiliano LLP

(57) ABSTRACT

Described herein are various embodiments of a network element including an access control list processing module to process an access control list of the network element. In one embodiment the access control list processing module converts the access control list into set of subsections of rules, where each rule of a subsection mutually exclusive of each other rule in the subsection. The network element may then make forwarding decisions for network data using the set of subsections of rules. In one embodiment, semantics preserving transformations can be applied to rules and data to enable more efficient processing of filtering or rules.

41 Claims, 10 Drawing Sheets

NETWORK SYSTEM - 100

(56) References Cited

U.S. PATENT DOCUMENTS

| | | | |
|---|---|---|---|
| 8,700,771 B1* | 4/2014 | Ramankutty | H04L 63/101 |
| | | | 370/389 |
| 8,798,057 B1 | 8/2014 | Goel et al. | |
| 9,215,205 B1 | 12/2015 | Smith | |
| 9,331,937 B2 | 5/2016 | Koponen et al. | |
| 9,882,766 B2 | 1/2018 | Sweeney et al. | |
| 10,587,516 B1 | 3/2020 | Arad et al. | |
| 2001/0011259 A1 | 8/2001 | Howard | |
| 2003/0110192 A1* | 6/2003 | Valente | G06F 21/50 |
| | | | 715/234 |
| 2003/0172205 A1 | 9/2003 | Bastian | |
| 2006/0184492 A1 | 8/2006 | Long et al. | |
| 2007/0143851 A1 | 6/2007 | Nicodemus et al. | |
| 2009/0031129 A1 | 1/2009 | Milliken et al. | |
| 2009/0052456 A1 | 2/2009 | Lu | |
| 2009/0234841 A1* | 9/2009 | Watanabe | G06F 16/9017 |
| 2010/0110915 A1* | 5/2010 | Mortensen | H04L 63/1416 |
| | | | 370/252 |
| 2010/0175124 A1 | 7/2010 | Miranda | |
| 2010/0274584 A1 | 10/2010 | Kim | |
| 2010/0299741 A1 | 11/2010 | Harrison et al. | |
| 2011/0060713 A1 | 3/2011 | Harrison et al. | |
| 2011/0283348 A1 | 11/2011 | Ling et al. | |
| 2013/0242993 A1* | 9/2013 | Basso | H04L 45/16 |
| | | | 370/390 |
| 2013/0301641 A1* | 11/2013 | Anand | H04L 63/0227 |
| | | | 370/389 |
| 2014/0082176 A1* | 3/2014 | Basso | G06F 15/167 |
| | | | 709/224 |
| 2015/0010000 A1 | 1/2015 | Zhang et al. | |
| 2015/0263889 A1 | 9/2015 | Newton | |
| 2015/0309184 A1* | 10/2015 | Viscovic | A61N 5/1001 |
| | | | 600/1 |
| 2017/0163575 A1 | 6/2017 | Wang et al. | |
| 2018/0082076 A1 | 3/2018 | Murray | |
| 2019/0182367 A1 | 6/2019 | Kim et al. | |

OTHER PUBLICATIONS

U.S. Appl. No. 15/799,821, filed Oct. 31, 2017.
Non-Final Office Action dated Oct. 18, 2019 of U.S. Appl. No. 15/799,821.
Reply to Non-Final Office Action dated Oct. 18, 2019 as filed on Feb. 27, 2020 of U.S. Appl. No. 15/799,821.
Notice of Allowance dated Mar. 18, 2020 of U.S. Appl. No. 15/799,821.

* cited by examiner

MODULAR NETWORK ELEMENT - 1000

HASH-BASED ACL LOOKUP OFFLOAD

CROSS-REFERENCE

The present application claims the benefit of provisional application Ser. No. 62/300,389, filed on Feb. 26, 2016, which is hereby incorporated by reference.

FIELD OF INVENTION

Embodiments relate generally to data networking and more particularly to performing packet classification including access control using hashed-based lookup offload.

BACKGROUND OF THE INVENTION

Packet classification lists, of which Access Control Lists (ACLs) are a special case, consists of an ordered series of rules, where each rule has a match criterion and an action. An ACL is applied to a piece of data by evaluating the data against these rules in order and taking the action of the first rule that matched. For example, a match criterion for each rule is a pair (V, M), where V is a numeric value up to N bits long and M is a mask of N bits having a binary value of 0 or 1. A value X matches the rule if (X & M)=(V & M), where "&" is the bitwise "logical and" operator.

In one example, the values (X) matched against an ACL entry/rule are Internet Protocol (IP) v4 or IPv6 addresses. In this example, the (V, M) pairs match subsets of the IPv4 or IPv6 address space, and the actions of an ACL are either "permit" or "deny". Also, each ACL is terminated by an "implicit deny" rule at the end equivalent to "deny (0, 0)," which denies every address that is not explicitly covered by another preceding rule in the ACL.

In addition, because the ACL is ordered, preceding rules in the ACL can overrule some or all of a subsequent rule for overlapping ranges of addresses. For example, if the ordered rules are "permit 128.1.1.0/24, permit 128.1.2.0/24, and deny 128.1.0.0/20," because the permit rules are ordered higher in the ACL, the permit rules overrule the overlapping address ranges of the deny rule. As a result, the addresses are permitted by this ACL are "128.1.1.0-128.1.2.255" and the addresses denied are "128.1.0.0-128.1.0.255" and "128.1.3.0-128.1.255.255". One problem with an ordered ACL is that the ACL can include hundreds or thousands of rules and evaluating this ACL can require complicated hardware resources of the network element, such as a ternary content addressable memory (TCAM) that is used to evaluate the ordered rules.

SUMMARY OF THE DESCRIPTION

Described herein are various embodiments to process and encode access control entries within an access control list and process the encoded access control entries using a hash-based ACL lookup offload engine within a network element.

One embodiment provides for a non-transitory machine-readable medium having executable instructions to cause one or more processing units to perform operations to convert an ordered access control list into a set of contiguous subsections of access control entries, the operations comprising receiving an access control list of access control entries, wherein each of the access control entries includes a network data characteristic and an action; converting the access control list into set of subsections of rules, wherein each rule of a subsection is mutually exclusive of each other rule in the subsection; and storing a description of each subsection of rules, wherein the set of subsections of rules is used by a network element to make forwarding decisions for network data.

One embodiment provides for a network element including an access control list processing module to process an access control list associated with a port of the network element, the access control list processing module to convert the access control list into set of subsections of rules, each rule of a subsection mutually exclusive of each other rule in the subsection; and a data plane to make forwarding decisions for network data received via the port of the network element using the set of subsections of rules. In one embodiment each of rule of a subsection is selected from the group consisting of a permit rule and a deny rule. In other words, a matched rule can result in a decision to permit the forwarding of network data or to deny the forwarding of network data.

One embodiment provides for a network processing system including memory to store a processed access control list, the processed access control list including a set of subsections of rules, each rule of a subsection mutually exclusive of each other rule in the subsection; a hardware hash table to store hash values associated with each rule of the subsection; and one or more processors to apply the transformed access control list to network data within a network element, the processors including logic to load a description of a subsection of the processed access control list and evaluate each rule in the subsection by performing a lookup in the hardware hash table for a hash of a masked flow label associated with the network data.

In a further embodiment, one or more processors are additionally configured to derive the flow label associated with the network data based on one or more characteristics of the network data. To derive the flow label, the one or more processors can to determine whether a transform is applied to the rules of the subsection and apply the transform to the characteristics of the network data used to derive the flow label. The one or more processors, in response to locating a match in the hardware hash table, are to perform an action on the network data, which is specified by the rule associated with the match. The action can include to permit the network data, deny the network data, set a traffic class for the network data, or set a next hop for the network data. Other actions may also be performed, such as incrementing a counter, applying a policer, applying a load balancing vector, or generally affecting further processing of the packet for the network data. In one embodiment the data plane of the network element is configured to sequentially evaluate each rule in a subsection and forward or drop a unit of network data based on a first matching rule in the subsection. In one embodiment, the rules of each subsection are evaluated in parallel.

Other methods and apparatuses are also described, including various optimizations that may be performed during the processing of the access control list.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
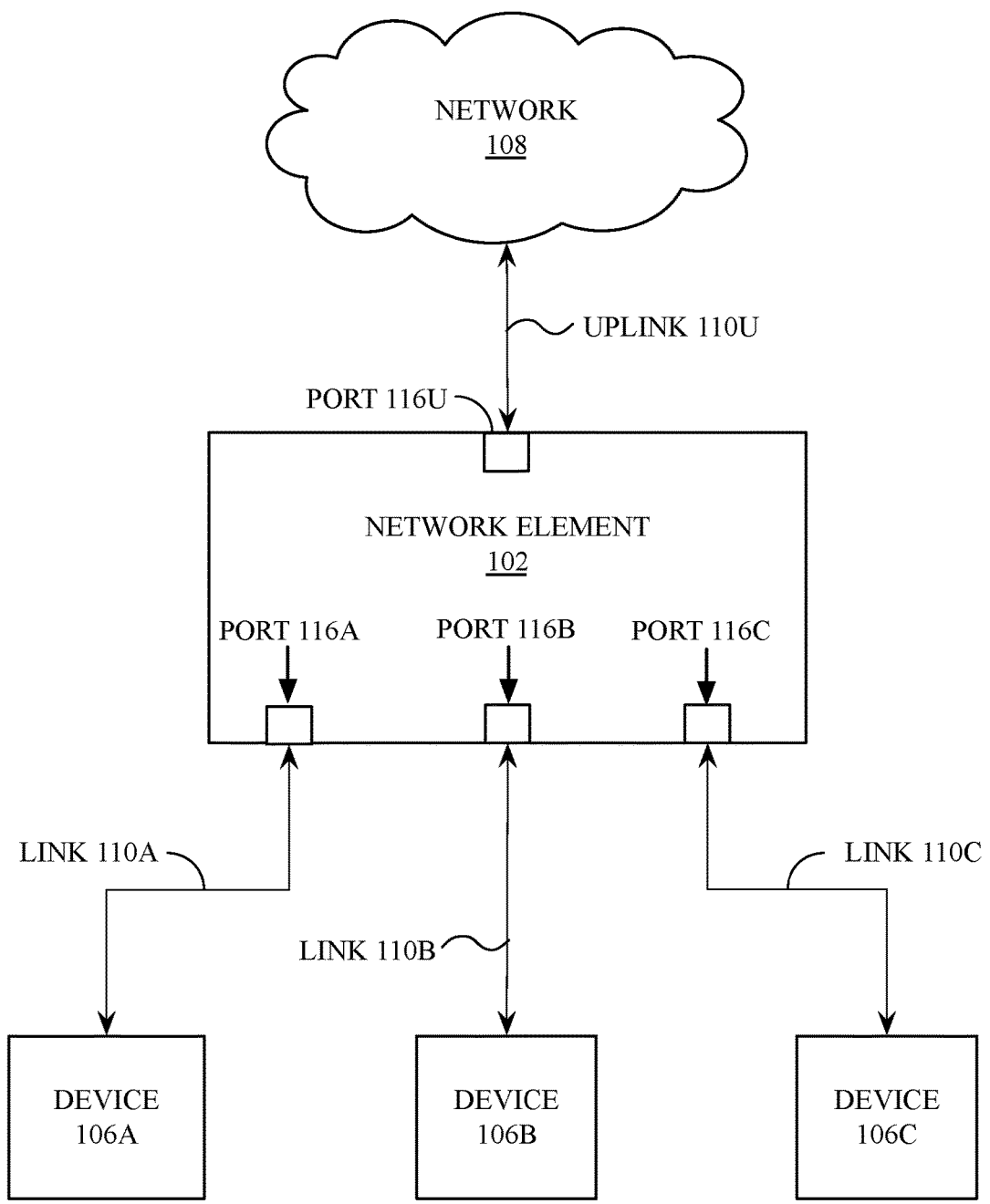
FIG. 1 is a block diagram of one embodiment of a system that includes a network element communicating network data between a network and a number of devices.

Embodiments described herein provide hash-based ACL lookup offload hardware for performing ACL operations on network data within a network element. To avoid the use of expensive TCAM hardware, one embodiment provides for an ACL processing module that converts an arbitrary ACL of ordered rules into contiguous subsections, with each subsection consisting of rules with the same mask. The rules in each such subsection are then loaded into a hardware hash table that looks up the unmasked fields of the packet that are associated with that subsection, and retrieves an indication of the desired result {permit, deny, set traffic class, set next hop, etc.} or will not retrieve any result, which is a miss. Thus, a TCAM based approach of evaluating ACLs can be replaced by a software/hardware-based approach that includes processing the ACL and performing lookups on the processed ACL using the hash-based ACL lookup offload engine. The processing of the ACL can be performed by the network element or another device, such as a network management station (NMS), a software defined network controller, or another device in the network.

One embodiment provides hardware support for at least 16,000 160-bit ACLs. Many of the access control entries in the ACL may not require the full width of the hash table in hardware, so the actual number of ACLs supported may be larger. Support is provided for multiple ACL types including quality of service ACLs, policy based routing ACLs, and security ACLs. The processing results of the different types of ACLs may be differently encoded. Various network address protocols are supported and addresses or address ranges may be specified, for example, as Internet Protocol (IP) addresses (e.g., IPv4, IPv6), Transmission Control Protocol (TCP) ports, or User Datagram Protocol (UDP) ports. In one embodiment, a MAC address can be specified in an ACL entry.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines. In one embodiment the network element 102 can also be a virtual machine.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
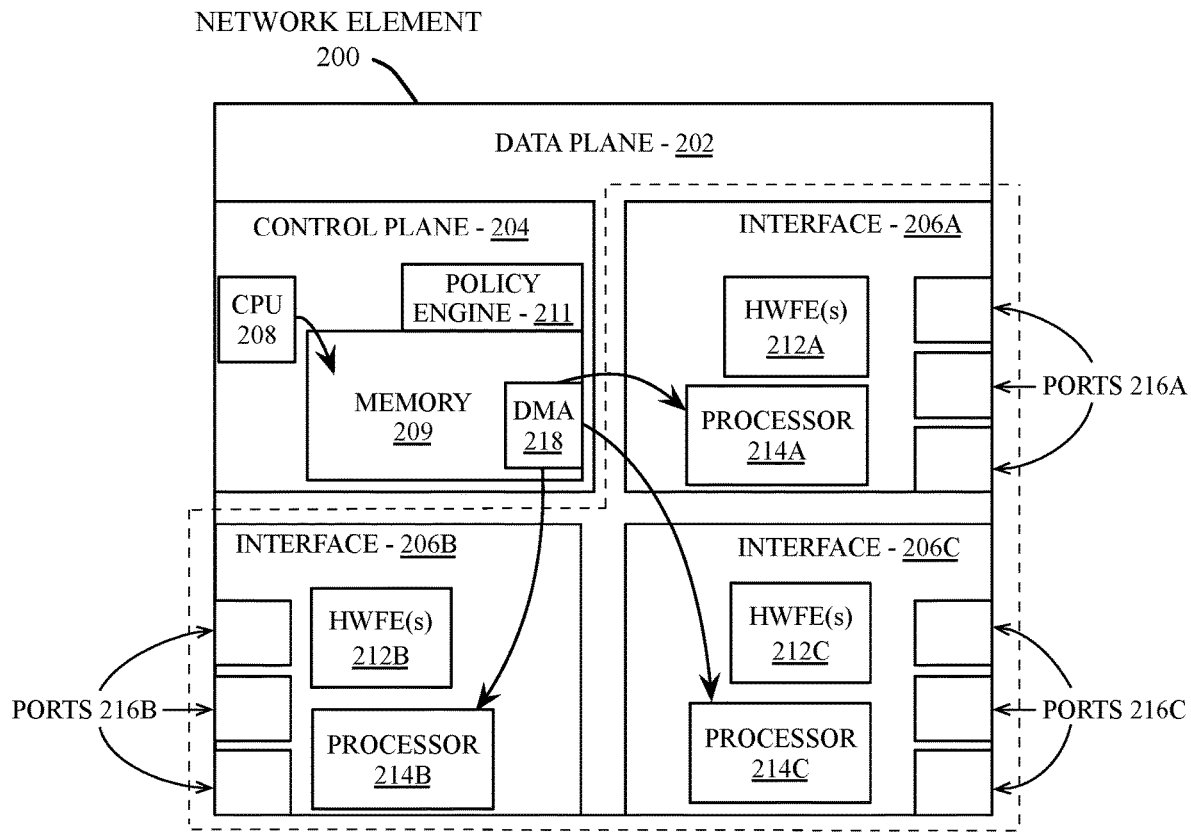
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can be configured to program corresponding hardware forwarding engines 212A-C. The processors 214A-C can also push data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209. In one embodiment, the DMA controller 218 allows the processors 214A to directly access the memory 209 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
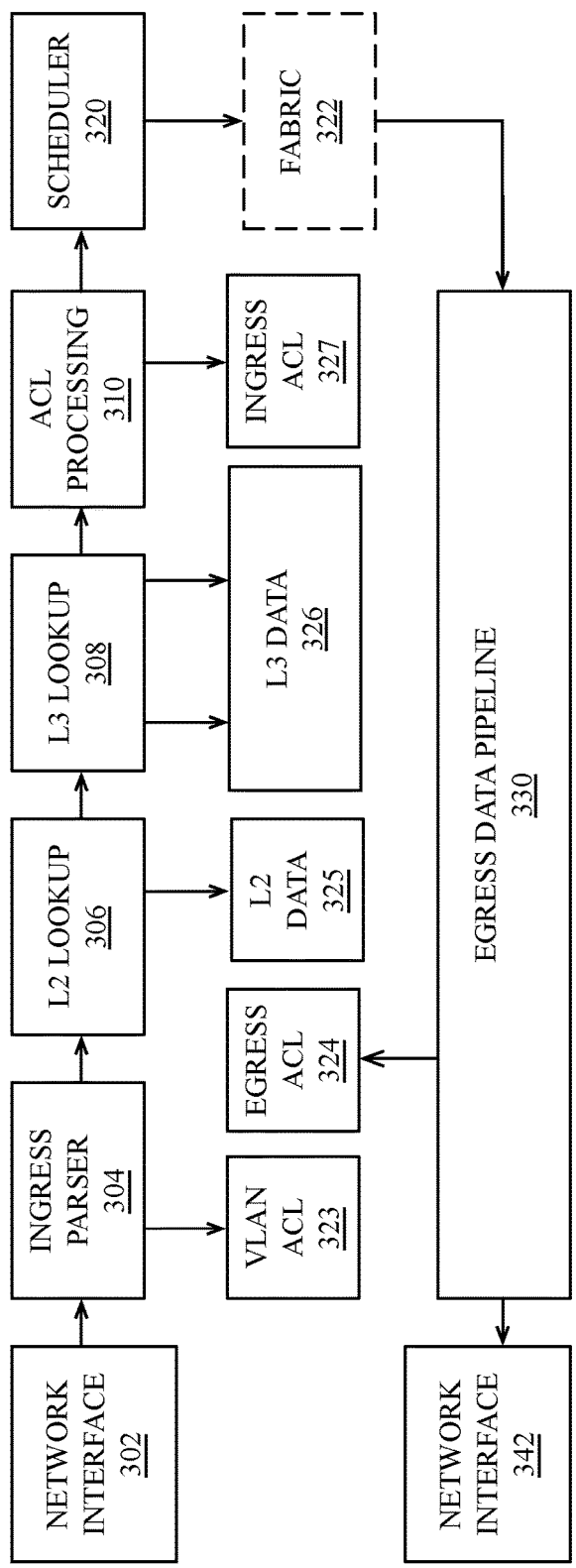
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 212), which includes logic from one or more of the HWFE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320. In one embodiment, the ACL processing block 310 includes ACL processing logic as described herein.

Access control lists including a VLAN ACL 323, Ingress routed ACL and QOS ACL or policy based routing 327, and Egress ACL 324 allow policy and filtering actions to be performed on network data at multiple stages within the forwarding pipeline 300. The ACLs store an ordered list of rules that define access restrictions for entities of the network element, including a specified network interface (e.g., ingress network interface 302, egress network interface 342). In one embodiment, network data may be forwarded to the control plane of the network element, and an ACL can be configured to specify access restrictions to the control plane. The ACL rules specify the data to which fields of network data are compared.

In one embodiment the forwarding pipeline 300 is configured to forward units of network data that match all conditions in a permit rule and to drop units of network data that match all conditions in a deny rule. For some ACLs, the forwarding pipeline is configured to implicitly deny (e.g., drop) units of network data that do not match at least one rule. Upon arrival at the ingress network interface 302, a unit of network data is processed based one or more ingress ACLs associated with the network interface 302 (e.g., VLAN ACL 323, Ingress ACL 327). In one embodiment, the network data can be additionally processed based on the egress ACL 324 before being forwarded via the egress network interface 342. In one embodiment, the ACLs can be used to perform actions other than permit and deny. For example, an access control entry may be specified which sets a traffic class for a unit of network data or sets a next hop for a unit of network data or a policer to be applied to the networks data.

If a unit of network data is permitted through ACL processing, a forwarding decision can be made for the data. The L2 data 325 and L3 data 326 modules store various tables used to perform data-link layer (layer 2) and network layer (layer 3) forwarding of network data by the forwarding pipeline 300. In one embodiment, after processing and forwarding operations are performed by ingress elements of the forwarding pipeline, the scheduler 320 forwards ingress network data to a fabric module 322, which provides data-plane connectivity between multiple packet processors in the network element. In one embodiment a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342. The egress data pipeline 330 can operate in parallel with other elements of the forwarding pipeline 300 described herein.

In one embodiment, forwarding operations for a unit of network data proceed as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, the ingress parser 304 can perform a further comparison for the unit of network data against any configured Port ACLs by performing a lookup in the VLAN ACL 323. If the unit of network matches a DENY statement the unit will be dropped. If the unit of network data matches a PERMIT statement, or no port ACL is enabled, the unit of network data is passed to the next block of the pipeline. Successive stages include L2 lookup 306 and an L3 lookup 308 stages. The L2 lookup 306 stage will reference L2 data 325, which may be a MAC address table, which is an exact-match table. The L3 lookup 308 will reference L3 data 326, which includes an exact-match table that contains /32 IPv4 and /128 IPv6 host routes, and a longest-prefix match (LPM) table that contains IPv4 and IPv6 routes that are not host routes.

ACL Processing

Figure 4:
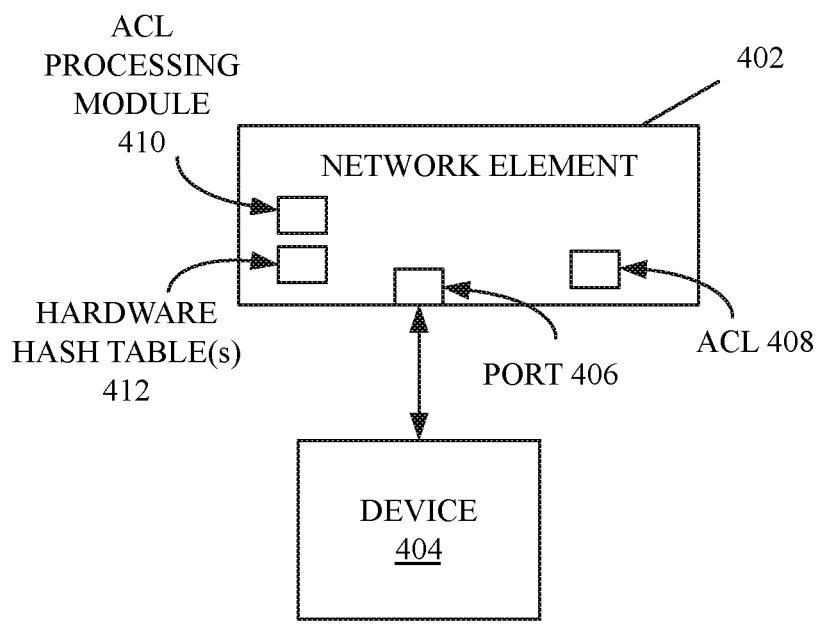
FIG. 4 is a block diagram of an ACL processing system, according to an embodiment.

FIG. 4 is a block diagram of an ACL processing system 400, according to an embodiment. The ACL processing system 400 includes a network element 402 that is coupled to a device 404 via a port 406. The network element 402 uses an ACL 408 to filter network data received via the port 406. The ACL 408 can be any ACL described herein, including the VLAN ACL 323, egress ACL 324, or ingress ACL 327 of FIG. 3. The network element 402 additionally includes an ACL processing module 410, which, in one embodiment, includes hardware to perform ACL processing logic as described herein.

In one embodiment the ACL processing module 410 of the network element 402 converts the ACL 408, which may be an ordered ACL, into contiguous subsections, where each subsection consists of rules with the same mask. An ordered ACL can consist of an ordered series of rules, with each rule having a match criterion and an action. An ACL is applied to a piece of data by evaluating the data against the rules in order and taking the action of the rule that matched. The match criterion for each rule is a pair (V, M), where V is a numeric value up to N bits long and M is a mask of N 0 and 1 bits. A value X matches the rule if (X & M)=(V & M), where "&" is the bitwise "logical and" operator. In one embodiment, the values (X) matched against an ACL are Internet Protocol (IP) v4 or IPv6 addresses, or representations thereof. The address can be a source or destination address. In one embodiment, the (V, M) pairs match subsets of the IPv4 or IPv6 address space and the actions of an ACL are either a "permit" or a "deny". In one embodiment, an ACL be interpreted to include an "implicit deny" rule at the end that is equivalent to "deny (0, 0)".

In an ordered ACL, a preceding rule in the ACL takes precedence over a subsequent rule. With an ordered ACL having possibly hundreds of ordered rules, evaluating the rules for an address for each unit of network data can require expensive hardware, such as a ternary content addressable memory (TCAM) that is used to evaluate the ordered rules. To avoid the use of expensive TCAM hardware, in one embodiment, the ACL processing module 410 converts an arbitrary ACL of ordered rules into contiguous subsections, where each subsection consists of rules with the same mask. The rules in each such subsection are then loaded into one or more hardware hash table(s) 412 that can be referenced to perform lookups of unmasked fields of a network data packet that are associated with the subsection. The lookup to the one or more hardware hash table(s) 412 can be used to retrieve an indication of the desired result {permit, deny, set traffic class, set next hop, etc.}. In such embodiment, a TCAM based approach of evaluating ACLs can be replaced by a software/hardware-based approach that includes processing the ACL and performing lookups on the processed ACL using the hash-based ACL lookup offload engine. While in one embodiment, the network element 402 performs the ACL conversion, in alternate embodiments, the ACL conversion is performed by another device (e.g., a network management station (NMS), a software defined network controller, or another device in the network).

In one embodiment the ACL processing module 410 supports for multiple ACL types including quality of service ACLs, policy based routing ACLs, and security ACLs. The processing results of the different types of ACLs may be differently encoded. The one or more hardware hash table(s) 412 can be configured to perform lookups based on rule mask groups associated with the subsections generated by the ACL processing module 410. In one embodiment, multiple rules associated with multiple subsections can be loaded into the one or more hardware hash table(s) 412. As the lookups can be performed on a per-mask group basis, multiple sets of hash values associated with multiple subsections can be loaded into one of the one or more hardware hash table(s) and a lookup for rules associated with each subsections can be sequentially performed based on the mask associated with each rule. In one embodiment, each of the one or more hardware hash table(s) 412 can be loaded with a separate subsection of rules. Packet payload and/or header data can be masked and compared against the rules in each of the one or more hardware hash table(s) 412. In one embodiment, the output result of a hash table is used as input of a successive hash table.

In one embodiment, a key property of a subsection is that the rules within a subsection are mutually exclusive. That is, if one rule in a subsection matches, then no other rule can possibly match. For example, if all rules only match on a destination network address, a unit of network data with destination network address (e.g., IP address) 1.2.3.4 will match at most one rule that matches only on IP destination address (e.g., the rule 'IP permit 1.2.3.4 any'). The mutual-exclusion property allows matching without ordering, and thus, without prioritization of the entries in a subsection.

In one embodiment, although all "rules" in a subsection are dispatched with a single lookup, the rules in a subsection are not "evaluated" in parallel. For example, there is no evaluation of rules that do not match, as there is simply a direct lookup to find the rule that does match, if any such rule exists. Additionally, no operation is performed in which the highest priority rule that matches is selected, as there is either a single match or no match. If any match occurs, that match is taken without consideration of priority, as no other rule in the segment may match. Thus, no consideration of priority takes place.

Specific details of a lookup engine that implements sequential processing of the subsections of an ACL as described in further detail below.

Subsection Descriptor Table

In one embodiment the ACL processing module 410 can create a representation of the ACL 408 by storing a description of each subsection that contributes to the ACL 408. In one embodiment the description includes the fields included in the lookup {e.g., source IP, 24 bits of destination IP, source TCP port}. This is represented as a mask against a predefined flow label for the type of network data associated with the lookup. The description can additionally include a pointer to a hash table, which can be defined by a number and base address. The description can additionally include a bucket format, which defines information to interpret the contents of the hash table. The bucket format can define how many entries are stored in a bucket (e.g., a grouping of data) and how to unpack the bucket contents into a flow label for a unit of network data. For example, a 160-bit wide bucket can be used to store five 32-bit fields. The bucket format entry in this case would indicate that there are 5 entries in the bucket, each entry is 32 bits wide, and each entry should be unpacked into bit position K of the flow label. Of course, more complex functions to map bits from the bucket into the flow label are possible (e.g., place 10 bits at offset 40 and 22 bits at offset 60). In one embodiment the description can additionally include a subsection discriminator that is used when multiple subsections share a hash table. The flow label described herein is any pre-defined arrangement or selection of bits within unit of network data that can be used to identify the type of network data associated with the ACL entry, and is not limited to any particular header field or data section, such as the IPv6 Flow Label field, although an explicit flow label field is one example of a characteristic of network data that may be used.

In general, network data characteristics include, but are not limited to source and destination network layer addresses (including IP or Ethernet addresses); source and destination Layer 4 ports (e.g. TCP, UDP, or SCTP ports); properties of a network data packet (e.g., length, input port, input VLAN), VLAN ID; MPLS label or labels; packet sequence numbers (e.g. TCP sequence number); QoS markings or QoS characteristics derived from configuration or prior processing; protocol type (IP, Ethernet); input physical port; TCP flags; any characteristic derived from deep packet inspection; any field extracted from the packet header or body; any data associated with the packet that is derived from prior processing in the forwarding element, such as, but not limited to QOS marking; VLAN ID, destination port, and/or virtual router instance ID.

In one embodiment, each subsection is evaluated in turn. If a match is found in a subsection, the ACL processing ends and the match result is taken. If no match is found, the ACL processing continues to the next subsection until there are no more subsections. In one embodiment, the ACL processing module 410 can support up to 32 subsections per ACL using the hash-based ACL lookup offload engine. At 4 cycles per lookup, this allows 128 cycles per unit of network data. In one embodiment, a priority can be defined between the subsections to preserve the ordering of the ACL entries that are spread between stages.

Multiple Entries Per Bucket

A bucket need not store the whole flow if only a subset of the bits is needed in a subsection. With 160-bit wide buckets, it is possible to use the bucket to store 5 rules that match only on IP v4 address (e.g., 32 bits) as long as the subsection description table encodes information about the number of entries stored in the bucket and how to map those entries into the "flow spec" to compare against a packet label. When a bucket containing multiple entries is accessed, only a single entry from the bucket is retrieved and compared against a packet. Each entry in the bucket is compared against the key and the result is propagated only if the entry matches, otherwise 0 is propagated. The results are ORed together such that there is no implied priority between different entries in a bucket.

A "subsection discriminator" is included in the bucket contents and this is used to allow multiple lookups to share a single subsection table. The subsection discriminator is associated with the subsection and is unique across all lookups sharing a single hash table. Thus, a 2-bit discriminator would be sufficient to allow 4 types of lookups to share a single hash table, which can be of significance in the event of a large number of small subsections. Thus four different types of packets, say routed/bridged ipv4/ipv6 could perform classification in different ACLs that all share the same hash tables.

Various optimizations to the hash-based ACL lookup offload logic described herein may be performed to improve performance and reduce the amount of memory used to store data. The optimizations can include but are not limited to semantics-preserving transformations to reduce subsections, cuckoo hashing, prefix-preserving transformations of fields, and mask expansion.

Semantics-Preserving Transformations to Reduce Subsections

It is possible to reduce the number of subsections required by an ACL by doing a semantics preserving transformation on the ACL. For example one embodiment is configurable to reorder denies or permits without changing the semantics of an ACL. An exemplary ACL is shown in Table 3 below.

TABLE 1

Exemplary Pre-Transformation ACL

| SEQUENCE # | Protocol | Action | Source Addr. | Dest Addr. |
|---|---|---|---|---|
| A | IP | permit | 1.2.3.4 | any |
| B | IP | permit | any | 1.2.3.4 |
| C | IP | permit | 3.4.5.6 | any |
| D | IP | permit | any | 3.4.5.6 |

The ACL of Table 1 would consist of four subsections as processed by a hash-based ACL lookup engine of the ACL processing module 410. However, the ACL of Table 1 is semantically equivalent to the ACL of Table 2 below.

TABLE 2

Exemplary Transformed ACL

| SEQUENCE # | Protocol | Action | Source Addr. | Dest Addr. |
|---|---|---|---|---|
| A | IP | permit | 1.2.3.4 | any |
| C | IP | permit | 3.4.5.6 | any |
| B | IP | permit | any | 1.2.3.4 |
| D | IP | permit | any | 3.4.5.6 |

A transformation of the ACL of Table 2 would consist of two subsections when processed by the hash-based ACL lookup engine of the ACL processing module 410. The transformations illustrated may be used to reduce the number of subsections when only the final action is important, rather than the specific ACL entry that is hit, which may be relevant in scenarios in which ACL entry hit counters are in use. In such scenario, semantic preserving transformations may be selectively disabled.

Cuckoo Hashing

In one embodiment Cuckoo hashing may be used to improve utilization of the memories. With Cuckoo Hashing, a hash table can be loaded to 80% full or better. In Cuckoo hashing, two hash functions are used instead of one. The two hash functions provide two possible locations in the hash table for each hash key. In one embodiment the hash table is split into two smaller tables of equal size, with each of the smaller tables occupying separate memories. Each hash function provides an index into one of these two tables. When a new key is inserted into the hash table, the new key is inserted in one of two possible locations identified by the two hash functions. The insertion may displace any key that already resides at the location. The displaced key can then be inserted in the alternate location for that key, which may then displace any existing key, until a vacant position is found. Performing a hash table lookup inspects the two possible locations of the hash table, (e.g., one lookup into each memory), which can be performed in constant time in the worst case.

Applied to the hash offload engine logic described herein, Cuckoo hashing can be used to look at two buckets per subsection (e.g., one entry from each bucket identified by the two hash keys). Each bucket in turn could contain multiple entries.

Prefix-Preserving Transformations of Fields

It may be advantageous to reduce the number of unique masks in any given ACL. In one embodiment the ACL processing module 410 can reduce the number of unique masks by transforming a field of the lookup key that preserves the critical properties on which the ACL matching depends. In particular, any transformation can be used that satisfies this property $t(f)<t(p)$ if and only if $f<p$ for all possible field values "f" and for all prefixes "p" that appear anywhere in the ACL.

In one embodiment, the transformation function is used on a field of a unit of network data before performing a lookup on the field. The transformed field is compared against the transformed value retrieved from the ACL. By way of illustration, a given ACL may have the set of prefixes in the source IP field of the ACL rules as shown in Classless Inter-Domain Routing (CIDR) notation in Table 3.

TABLE 3

Exemplary Source IP ACL Prefixes

| Index | IP/CIDR |
|---|---|
| 1 | 0/0 |
| 2 | 10.0.0.0/8 |
| 3 | 10.1.0.0/16 |
| 4 | 10.2.8.0/22 |
| 5 | 10.1.2.3/32 |
| 6 | 10.1.4.0/24 |

It will be noted that the 0/0 rule is implied by any access control list entry (ACE) that does not match on the source IP field. The transformation shown in Table 3 can be used on the source IP field.

TABLE 4

Exemplary Transformed Source IP ACL Prefixes

| Original Prefix | Transformed Prefix | Transformed Field Value |
|---|---|---|
| 10.1.2.3/32 | 10001 | 10001 |
| 10.1.4.0/24 | 10010 | 10010 |

TABLE 4-continued

Exemplary Transformed Source IP ACL Prefixes

| Original Prefix | Transformed Prefix | Transformed Field Value |
| --- | --- | --- |
| 10.1.0.0/16 | 101xx | 10100 |
| 10.2.8.0/22 | 110xx | 11000 |
| 10.0.0.0/8 | 1xxxx | 10000 |
| 0.0.0.0/0 | xxxxx | 00000 |

The transformed prefix is the ternary representation of the transformed prefix. The transformed field value is the transformed source IP for a packet that falls within the associated original prefix, using a longest-prefix-match selection algorithm. The algorithm searches all prefixes to find the longest prefix that matches the packet. Note that the prefix transformation compresses the source IP address into five bits and reduces the number of unique masks that appear in the rules for this field from 6 to 4.

In the set of transformations shown in Table 4, it may be noted that some of the transformed values will never be seen on an actual unit of network data. For example, 10.2.8.0/22 encodes to 11000, the fact that the transformed value of an address field of a unit of network data will never be 11001, 110010 or 11000 means that we can use 10.2.8.0 with either 0, 1 or 2 bits of don't care at the bottom at the cost of a single entry. Alternatively, if it is determined to expand 10.0.0.0/8 into all the possible transformed prefixes, not all 16 theoretical values are possible, only 5.

Additionally, prefix expansion can be used to reduce the number of possible subsections of rules by reducing the number of prefix masks required to apply the rules. When processing a set of ACL rules results in two subsections, with a first subsection having a prefix length of N and a second subsection having a prefix length of N+1, the prefixes of length N can be transformed into two rules, each having a prefix length of N+1. For example and in one embodiment, a rule associated with a /24 prefix can be transformed into two /25 prefixes to be placed into a subgroup having a mask associated with a /25 prefix.

Figure 5:
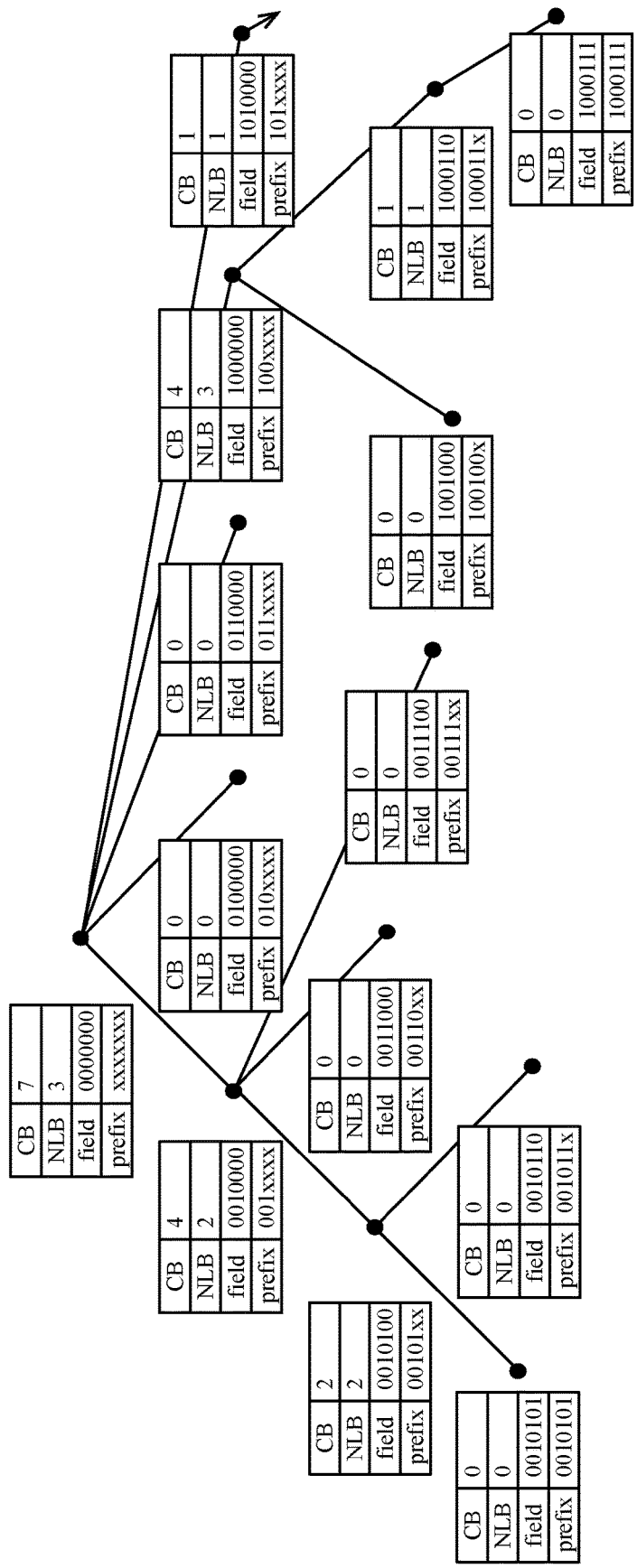
FIG. 5 is an illustration of a prefix tree illustrating the generation of prefix-preserving encoding, according to an embodiment.

FIG. 5 is an illustration of a prefix tree 500 illustrating the generation of prefix-preserving encoding, according to an embodiment. In one embodiment, a prefix tree 500 in the form a Patricia trie can be created for all prefixes for a field of the list, such as an IPv4 source or destination IP address, or an IPv6 source or destination address. For each node we define both the next level bits required (NLB), cumulative bits (CB), field and prefix. The NLB is 0 for terminal nodes and for non-terminal nodes it is log 2(number of children+(children_cover_all_underlying_prefix? 0:1)), meaning that if the children cover all the underlying prefixes the logic will not stop at that node. Accordingly, the node does not require encoding. The cumulative number of bits (CB) is the sum of NLB and the maximum CB of all the children of a node, which indicates the number of bits required to create a prefix preserving encoding. The field and the prefix are assigned starting at the root node and a field and prefix is assigned to each node unless the node is fully covered. The prefix encoding is performed using a longest prefix match lookup (LPM) into a unique field.

Port Mapping

TCP or UDP port ranges are fairly typical in ACLs, e.g. "gt 1023." The layer-four (L4) ports used in a subsection can be translated using a "port mapping" table that reduces the number of entries required to match on a range of ports to 1. This would require an additional lookup for that subsection. One way to implement this port mapping would be with a hash table for mapping individual ports or small ranges that could be expanded into individual entries. While port mapping and expansion is described in terms of L4 ports, this concept can also be applied to other fields.

In one embodiment the algorithm to map a port to a port mapping can build a decision tree where every overlapping range is broken up into separate ranges and a rule associated with a range that is being split is expanded into as many rules that are needed to cover all the sub ranges. For example, for a given set of port ranges {*(0-65535); (80-100); (78-84)}, the (78-84) range is split into two ranges (78-79) and (80-84), such that the ranges do not overlap unless a range is complexly nested within another range. For example, the each ranges is a subset of and fully nested within the set of all ports (0-65535). Additionally, the range (80-84) is fully nested within the range (80-100). Any rules based on the range (78-84) are split into one rule based on (78-79) and a second rule based on (80-84). This operation enables the prefix preserving transformation to reduce the size of the field (e.g., L4 port) and the number of unique masks that appear in the field. This allows multiple access control entries in an ACL associated with the same field and having different mask lengths before transformation to be transformed to have the same length, which allows the field values to be transformed to have the same length, reducing the number of subsections.

Thus, a field (e.g., source address, source port, etc.) may be transformed to cause the values to be strictly nested, as described above by splitting ranges. Then each masked field value that appears in an access control entry can be assigned a unique code in such a way that the set of transformed field values have fewer unique mask lengths than the original set of field values. Additionally, this transformation may also be used to reduce the size IPv6 addresses, reducing the amount of memory consumed to store IPv6 addresses and reducing the amount of hash table space consumed.

For the specific example of the L4 ports, when a packet or other unit of network data arrives, the source and destination ports in the header fields of the packet are transformed. In one embodiment, this transformation is performed by a set of hardware range comparators, for example a hash table using Cuckoo hashing. The range comparators and the hash table are ordered and a longest-prefix match can be used to determine the final transformed port. Small ranges can be expanded in the hash table by putting all values within the range in the hash table. Large ranges can use the range comparators.

Hash Functions

Various hash functions may be used to perform hashing operations. In one embodiment, a CRC hash of the masked flow label is used. However, any low latency hash function may be used, provided that the hash may be computed in one to two processing cycles, when sequential evaluation of the subsection rules is to be performed. Where parallel processing of adjacent subsections is to be performed, more complex (e.g., higher latency) hash functions may be used.

Mask Expansion

In some cases if there are two entries with nearly identical masks (e.g., /32 and /31), a single hash table with a /32 mask can be created by expanding the two cases of the /31 entry. For example, if a pattern of a 6-bit ACL entry is 00100x, that entry can be expanded into two entries: 001000 and 001001. The entries can be stored in a table in which all 6 bits are used in the hash key. This optimization may be useful for cases where there are small ranges (e.g., port ranges) or small bit fields (e.g., TCP flags).

Hashing Optimization with Explicit Priority Per Entry

A variant of the above approach can reduce the number of hash tables required, significantly in some cases, at a cost of only log N bits per entry, where N is the maximum number of ordered subsections in an ACL, approximately 15 bits per entry. In this approach, any pair of access control entries with the same hash mask can be placed together in a hash table, ignoring their placement in the user-specified ACL. Each entry has a sequence number stored with it that indicates its position in the user-specified ACL.

The matching procedure occurs sequentially, as described above. Each hash table matches, one after another in sequence, and the winning entry is the one with the lowest sequence number. This approach reduces the number of hash tables required to store a user specified ACL to the number of masks specified in the ACL.

Source and Destination IP ACL Offload Via LPM

In one embodiment, Deny ACLs that match only on source IP or destination IP may be treated like drop routes and loaded into the routing table rather than using the offload engine as long as there is no preceding rule that would permit a subset of those packets. Thus, an ACL containing a sequence of deny rules for a set of addresses without a higher priority permit rule impacting the set of addresses can be handled as drop routes within the routing table without employing the ACL lookup offload engine to perform those rules.

Figure 6:
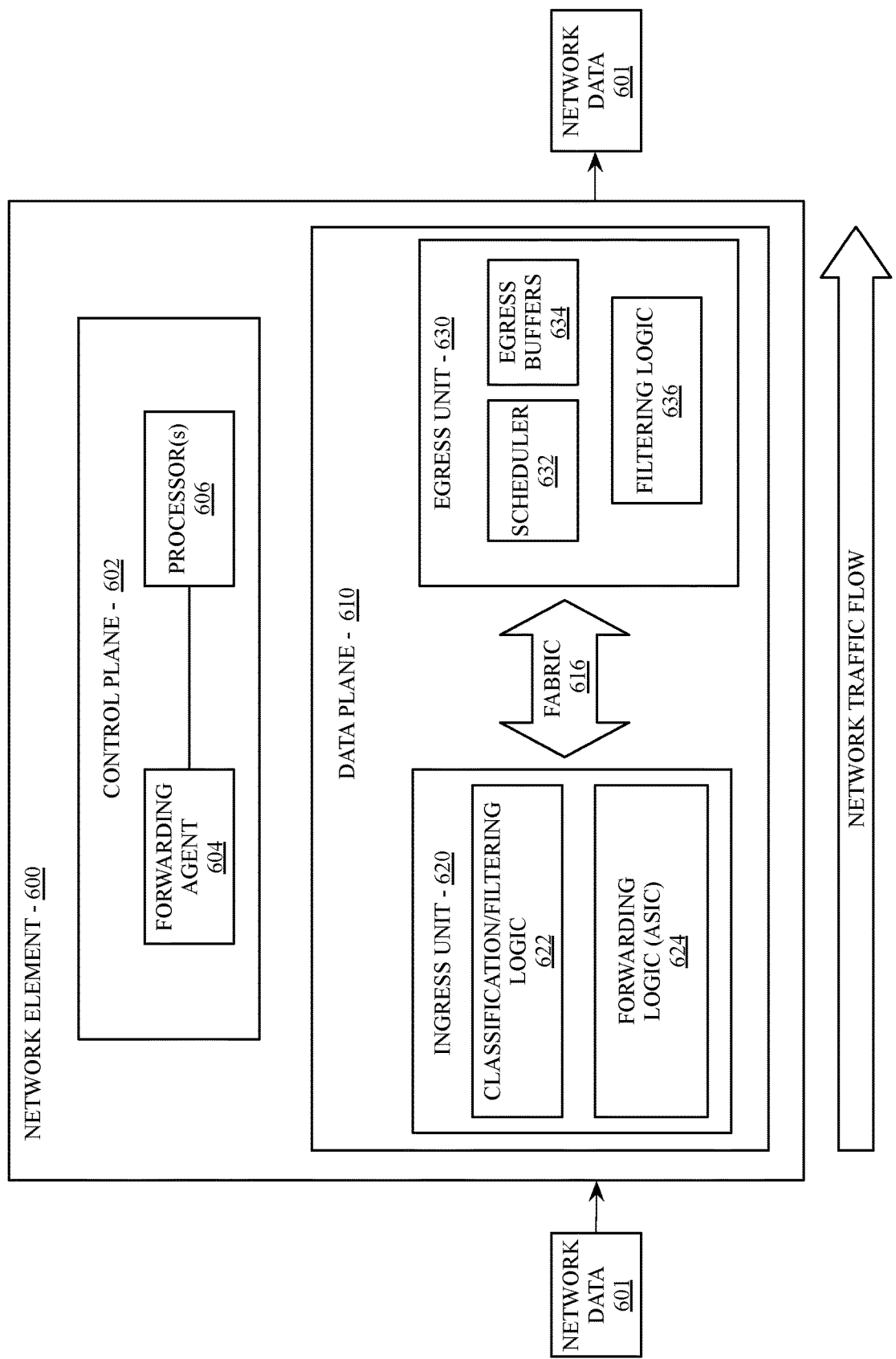
FIG. 6 illustrates logic a network element configured to perform hash based ACL lookup offload, according to an embodiment.

FIG. 6 illustrates logic a network element 600 configured to perform hash based ACL lookup offload, according to an embodiment. In such embodiment, the network element 600 includes a data plane 610 coupled to a control plane 602 having one or more processor(s) 606 and a forwarding agent 604. In one embodiment, the forwarding agent 604 is at least in part a software process executing on the one or more processor(s) 606 of the control plane 602. The processor(s) 606 are dedicated to control plane operations including programming one or more hardware forwarding engines, (e.g., HWFE(s) 206A-C of FIG. 2) such that all forwarding operations for network data occur on the data plane 610.

In one embodiment, the data plane 610 includes an ingress unit 620 and an egress unit 630, which may include logic to perform equivalent operations as those illustrated and described with respect to the forwarding pipeline 300 of FIG. 3. The ingress unit 620 includes various network interfaces and ports (not shown) to receive and process various data headers on units of incoming network data 601, and mapping/filtering logic 622 to process incoming data according to access control list entries and perform address lookups into the forwarding tables provided by the forwarding agent 604. In one embodiment the mapping/filtering logic 622 includes the ACL processing module 410 and one or more ACL(s) (e.g., ACL 408) as in FIG. 4. Forwarding logic 624 in the ingress unit 620 of the data plane 610, which may be an application specific integrated circuit (ASIC), is configured to perform line rate forwarding operations to the output ports indicated by the forwarding tables. The mapping/filtering logic 622 may also include an ASIC or a field programmable gate array (FPGA) containing hash tables and hash table lookup logic for the ACL lookup offload engine. In one embodiment, at least a portion of the deny rules of the ACLs may be satisfied by the forwarding logic 624 based on drop routes inserted into the routing table. In one embodiment at least some of the forwarding logic 624 operations may be In one embodiment, after an output port is determined for forwarded network data 601, the data may be buffered before being forwarded to the egress unit (e.g., egress unit 630) associated with the destination port, for example, across a crossbar fabric 616. The egress unit 630, in one embodiment, includes a scheduler 632 to grant scheduling credits to enables the ingress unit 620 to forward units of network data 610 to the egress unit 630. The units of network data 610 may be buffered in egress buffers 634 of the egress unit 630 before the network data 601 is transmitted via a destination port of the network element 600. In one embodiment, filtering logic 636 is also present in the egress unit to perform egress ACL operations.

Figure 7:
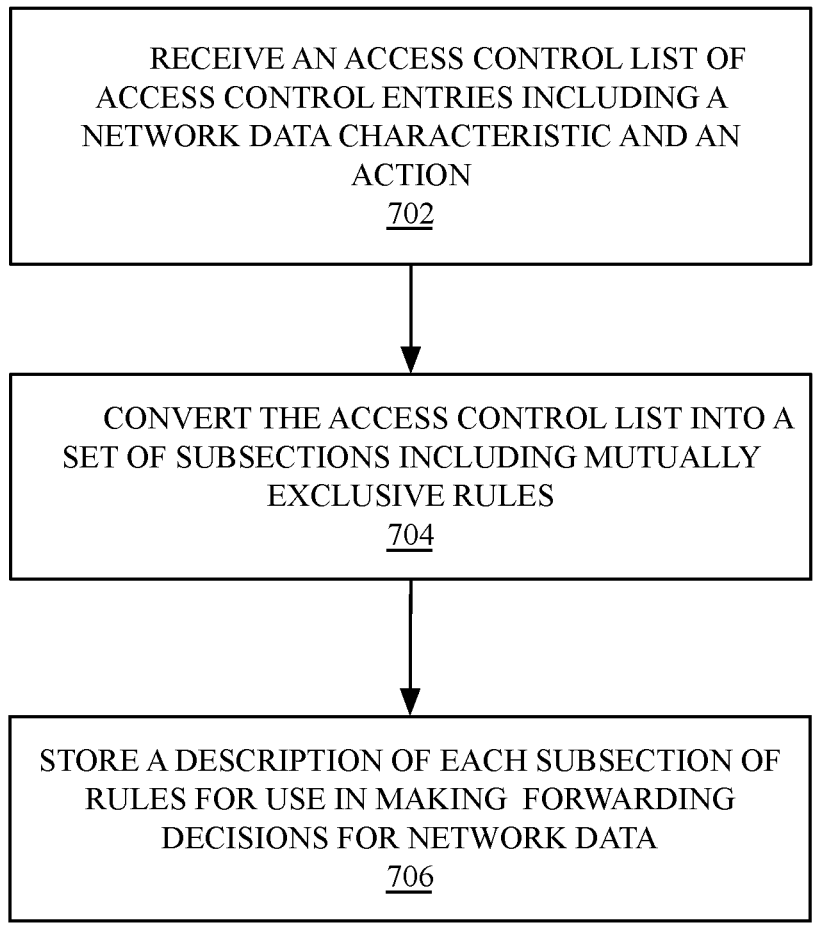
FIG. 7 is a flow diagram of ACL conversion logic, according to an embodiment.

FIG. 7 is a flow diagram of ACL conversion logic 700, according to an embodiment. The ACL conversion logic can be performed on a network element by the ACL processing module 410 of FIG. 4, or can be performed by a network management system coupled to the network element over a network. In one embodiment, the ACL conversion logic 700 is configured to perform operations to receive an access control list of access control entries, where the access control list entries include a network data characteristic and an action, as shown at block 702. In one embodiment the network data characteristic is an address range. The address range can be one of several types of network address ranges, including layer 2, layer 3, or layer 4 address ranges, including source and destination MAC addresses, source and destination IP addresses, and source and destination port numbers. In one embodiment each address range includes an address field and a mask associated with the address field. The rule generated from the access control entry can include an address range based on or derived from the address range of the access control entry, although a specified address range may be sub-divided into multiple rules. The action can include permitting data associated with an address range, denying deny data associated with an address range, setting a traffic class for the data, or setting a next hop for the data. For a permit rule resulting in a permit action, the permit rule can include a range of addresses associated with network data to be forwarded by the network element. The range of addresses, in one embodiment, may be a range of internet protocol (IP) addresses. For a deny rule associated with an action denying data associated with an address range, and deny rule includes a range of addresses associated with network data to be dropped by the network element.

At block 704 the ACL conversion logic 700 can convert the access control list into a set of subsections including mutually exclusive rules. Each rule is mutually exclusive of the other rules in a segment, such that a match on a rule precludes a match on any other rule in a segment. Converting the access control list into a set of subsections of rules can include grouping access control entries of the access control list into subsections, where each subsection associated with a single mask. Each unique mask in the access control list is associated with a different segment of rules. Additionally, a prefix preserving or some other semantics preserving transformation can be applied to an access control entry during conversion. For example, transforming the address field using a prefix-preserving transformation can reduce the number of unique masks, and thus the number of segments, such that multiple transformed addresses can be associated with the same mask without affecting the filtering results. In one embodiment, converting the access control list can also include the sub-division of address ranges of the access control list such that the address ranges do not overlap unless an address range is fully nested within another address range. The prefix-preserving transformation and the sub-division of address ranges can be combined such that each mask field value that appears in an access control entry can be assigned a prefix-preserving code that is unique within a subsection. The transformation can be performed such that the set of transformed values have fewer unique masks lengths than the original set of field values of the original access control entries. In one embodiment, this transformation may be performed using a longest prefix match (LPM) data structure.

At block 706 the ACL conversion logic 700 can store a description of each subsection of rules. The subsections of rules can then be used by a network element to make forwarding decisions for network data. In one embodiment the description of each subsection includes a transformed address field, a pointer or another identifier for a hash table, and information to interpret the hash table contents. The transformed address field includes transformed data associated with a field (e.g., source IP, destination IP, source TCP port) that is represented as a mask against a predefined flow label for the type of network data associated with the ACL entry. In one embodiment the hash table stores multiple groupings (e.g., buckets) of data and the information to interpret the contents of the hash table includes the number of entries stored in each bucket of data and a mapping is stored that indicates how to unpack the contents of the bucket into the flow label. Once the data describing the processed ACL data is stored, the data can be used by a network element to perform the filtering operations defined by the ACL.

Figure 8:
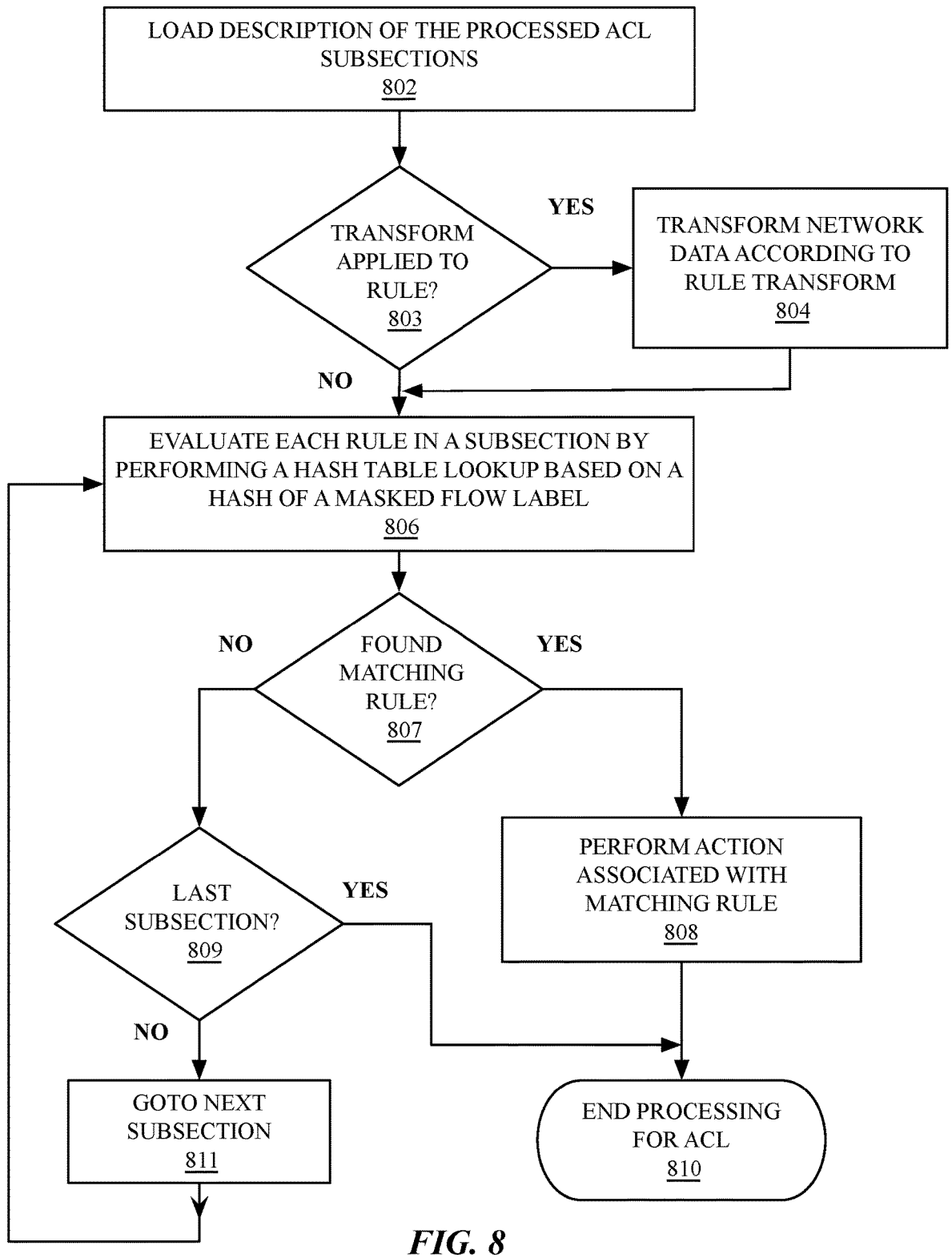
FIG. 8 is a block diagram of ACL lookup logic, according to an embodiment.

FIG. 8 is a block diagram of ACL lookup logic 800 according to embodiment. In one embodiment the ACL lookup logic 800 can be performed by an ACL processing module 310 as in FIG. 3 and/or by mapping/filtering logic 622 as in FIG. 6. As illustrated, at block 802 the ACL lookup logic 800 can load a description of the processed ACL subsections, which may be created using the ACL conversion logic 700 in FIG. 7. In the event one or more transformations have been applied to the rules, such a semantics preserving transformations or a prefix preserving transformation, as determined at block 803, the associated transformation is applied to network data to be evaluated at block 804 before the network data is evaluated against the rules of a subsection at block 806. The semantics preserving transformation is a transformation such that a comparison performed between transformed data and transformed rules reaches the same result as a comparison between untransformed data and untransformed rules. However, by performing the semantics preserving transformation the number of unique masks can be reduced.

As shown at block 806, the ACL lookup logic 800, can be configured to evaluate each rule in a subsection by performing a hash table lookup based on a hash of a masked flow label. In one embodiment the rules in a subsection are evaluated sequentially. In one embodiment the rules in a subsection are evaluated in parallel. In one embodiment, multiple subsections can be evaluated in parallel.

If a matching rule is found at block 807, the ACL lookup logic 800 can perform the action associated with the rule, as shown at block 808. Once a matching rule is found and the action associated with the matching rule is performed, the ACL lookup logic 800 ends processing for the ACL, as shown at block 810. The ACL lookup logic 800 may be repeated for any additional ACLs that may be applied during the processing of a unit of network data.

If a matching rule is not found at block 807, the ACL lookup logic 800 determines if the previously processed subsection is the last subsection, as shown at block 809. If the previously processed subsection is the last subsection, then the ACL lookup logic 800 ends the processing for the ACL at block 810. If the ACL is configured to implicitly deny data, then the ACL lookup logic 800 directs the network element to drop (e.g., do not forward) the processed unit of network data. If the previously processed subsection is not the last subsection at block 809, then the ACL lookup logic 800 will proceed to block 811 and process the next subsection. The ACL lookup logic 800 will then return to block 806 evaluate each rule in the next subsection. The evaluation will continue until a match is found at block 808 or all subsections have been evaluated.

Exemplary Data Processing System and Modular Network Element

Figure 9:
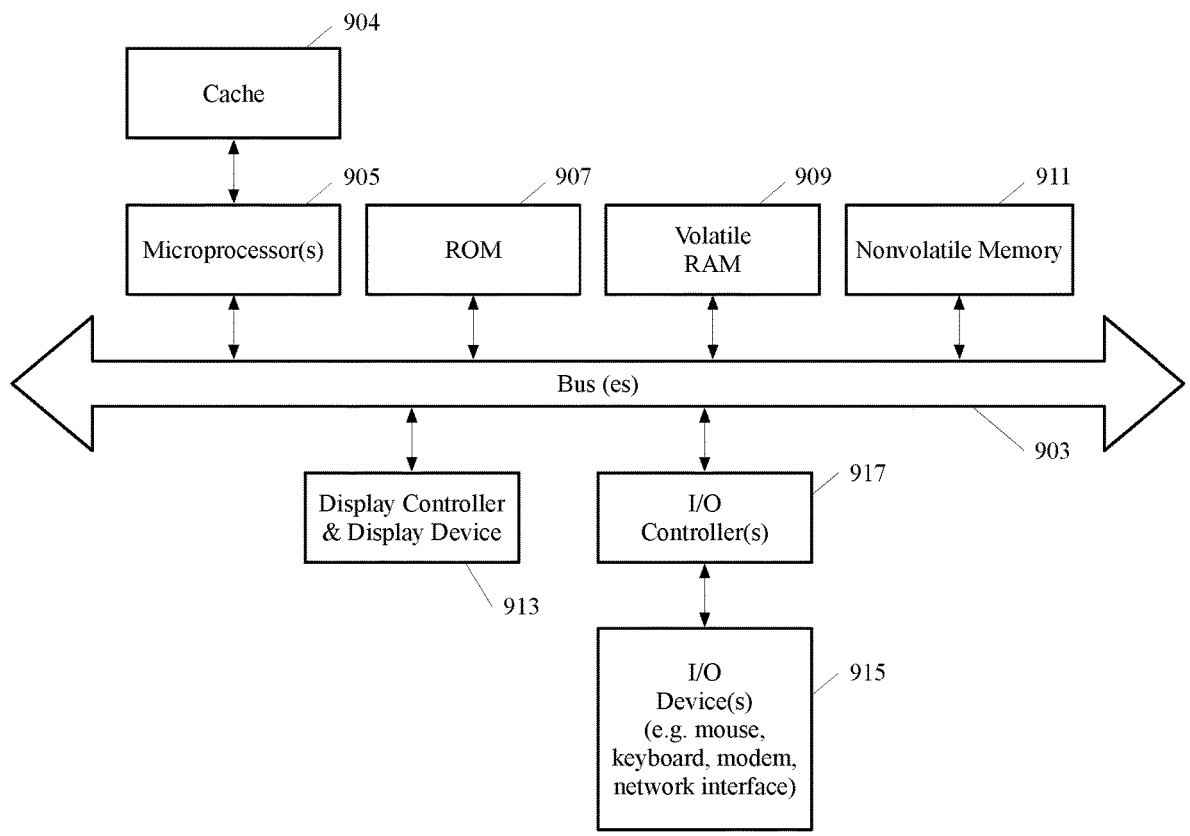
FIG. 9 shows one example of a data processing system that may be used with one embodiment.

FIG. 9 shows one example of a data processing system 900 that may be used with one embodiment. For example, the data processing system 900 may be implemented within any one of the network elements described herein, including network element 100 as in FIG. 1. In one embodiment, the data processing system 900 is used within the control plane of a network element described herein. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 900 includes one or more bus(es) 903 which couple to one or more microprocessor(s) 905, ROM (Read Only Memory) 907, volatile RAM 909 and a non-volatile memory 911. In one embodiment, the one or more microprocessor(s) 905 couple to a cache 904, which can include one or more sets of instruction and/or data caches. The bus(es) 903 may include one or more buses connected to each other through various bridges, controllers and/or adapters as is well known in the art.

The microprocessor(s) 905 may retrieve the instructions from the memories 907, 909, 911 and execute the instructions to perform operations described above. Instructions and/or associated data retrieved from the memories 907, 909, 911 may be stored in the cache 904. The bus(es) 903 interconnect system components with each other, and to a display controller and display device 913, and to peripheral devices such as input/output (I/O) devices, which may be mice, keyboards, modems, network interfaces, printers and other devices well known in the art. Typically, the input/output devices 915 are coupled to the system via input/output controller(s) 917. The volatile RAM (Random Access Memory) 909 is typically implemented as dynamic RAM (DRAM), which requires power continually in order to refresh or maintain the data in the memory, but may also include static ram (SRAM), which does not require a periodic refresh.

In one embodiment, the non-volatile memory 911 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 911 will also be a random access memory although this is not required. While FIG. 9 shows that the non-volatile memory 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
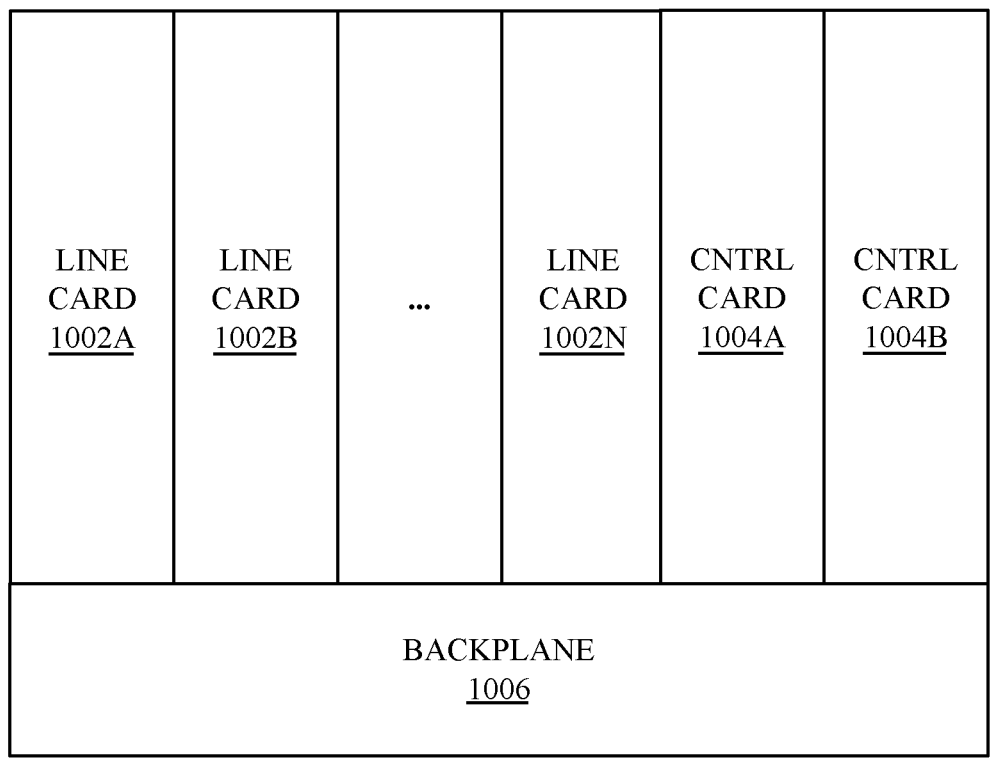
FIG. 10 is a block diagram of a modular network element, according to an embodiment.

FIG. 10 is a block diagram of a modular network element 1000, according to an embodiment. In one embodiment, the network element has a modular and expandable configuration that allows the addition or removal of resources configured as line cards 1002A-N, or controller cards 1004A-B coupled to a backplane 1006. In one embodiment, the controller cards 1004A-B control the processing of the traffic by the line cards 1002A-N, which can each include one or more network data forwarding devices such as interfaces 106A-C as in FIG. 1, although the precise nature of the forwarding devices is not limited as such. In addition, the controller card 1004A-B can collect and possibly aggregate timing data as described in FIG. 9 above. In one embodiment, the line cards 1002A-N process and forward traffic according to the network policies received from controller cards the 1004A-B. In one embodiment, one or more of the line cards 1002A-N can monitor and report internal performance data, such as latency data for all or selected units of network data traversing the network element. In one embodiment, the controller cards 1004A-B can also be configured to perform all or a sub-set of functions provided by the line cards 1002A-N. It should be understood that the architecture of the modular network element 1000 illustrated in FIG. 10 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Described herein are various embodiments to process and encode access control entries within an access control list and process the encoded access control entries using a hash-based ACL lookup offload engine within a network element.

One embodiment provides for a non-transitory machine-readable medium having executable instructions to cause one or more processing units to perform operations to convert an ordered access control list into a set of contiguous subsections of access control entries, the operations comprising receiving an access control list of access control entries, wherein each of the access control entries includes a network data characteristic and an action; converting the access control list into set of subsections of rules, wherein each rule of a subsection is mutually exclusive of each other rule in the subsection; and storing a description of each subsection of rules, wherein the set of subsections of rules is used by a network element to make forwarding decisions for network data.

One embodiment provides for a network element including an access control list processing module to process an access control list associated with a port of the network element, the access control list processing module to convert the access control list into set of subsections of rules, each rule of a subsection mutually exclusive of each other rule in the subsection; and a data plane to make forwarding decisions for network data received via the port of the network element using the set of subsections of rules. In one embodiment each of rule of a subsection is selected from the group consisting of a permit rule and a deny rule. In other words, a matched rule can result in a decision to permit the forwarding of network data or to deny the forwarding of network data. In one embodiment, each rule of a subsection is selected from a group comprising a permit rule and a deny rule. In one embodiment, to evaluate each rule in a subsection can include to transform network data to be evaluated based on a transform applied to each rule.

One embodiment provides for a network processing system including memory to store a processed access control list, the processed access control list including a set of subsections of rules, each rule of a subsection mutually exclusive of each other rule in the subsection; a hardware hash table to store hash values associated with each rule of the subsection; and one or more processors to apply the transformed access control list to network data within a network element, the processors including logic to load a description of a subsection of the processed access control list and evaluate each rule in the subsection by performing a lookup in the hardware hash table for a hash of a masked flow label associated with the network data.

In a further embodiment one or more processors are additionally configured to derive the flow label associated with the network data based on one or more characteristics of the network data. To derive the flow label, the one or more processors can to determine whether a transform is applied to the rules of the subsection and apply the transform to the characteristics of the network data used to derive the flow label. The one or more processors, in response to locating a match in the hardware hash table, are to perform an action on the network data, which is specified by the rule associated with the match. The action can include to permit the network data, deny the network data, set a traffic class for the network data, or set a next hop for the network data. Other actions may also be performed, such as incrementing a counter, applying a policer, applying a load balancing vector, or generally affecting further processing of the packet for the network data. In one embodiment the data plane of the network element is configured to sequentially evaluate each rule in a subsection and forward or drop a unit of network data based on a first matching rule in the subsection. In one embodiment, the rules of each subsection are evaluated in parallel.

Other methods and apparatuses are also described, including various optimizations that may be performed during the processing of the access control list. In one embodiment network data characteristics described herein include an address range, the address range including an address field and a mask, and each rule of a subsection includes an address range. The addresses may be IP addresses, or other forms of addresses, including port addresses such as TCP or UDP port addresses. In one embodiment, a MAC address can be specified.

In one embodiment, converting an access control list into a set of subsections of rules includes grouping access control entries of the access control list into subsections, each subsection associated with a single mask. In one embodiment, converting the access control list additionally comprises reducing a number of unique masks in the access control list by transforming the list of access control entries using a semantics preserving transformation and/or a prefix-preserving transformation. In one embodiment converting the access control list additionally comprises subdividing address ranges of the access control list such that the address ranges do not overlap unless an address range is fully nested within another address range. In one embodiment, storing a description of each of the subsections in the set of subsections of rules includes storing a mask to apply to the fields, an identifier for a hash table, and information to interpret contents of the hash table, wherein the hash table stores multiple groupings of data. In one embodiment, a transformed address field represents one of a source address, a destination address, and source and destination ports. The information to interpret the contents of the hash table can include a number of entries stored in each grouping of data in the hash table and a mapping of data in each entry into a flow label associated with network data.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A non-transitory machine-readable medium having executable instructions to cause one or more processing units to perform operations to convert an access control list into a set of subsections of access control entries, the operations comprising:
    receiving an access control list of access control entries, wherein each of the access control entries includes a network data characteristic and an action;
    converting the access control list into subsets of rules, wherein each rule of one of the subsets of rules is mutually exclusive of each other rule in the subset of rules to allow matching without ordering of the rules; and
    storing a description of each of the subsets of rules, wherein the subsets of rules are used by a network element to make forwarding decisions for the network data, the storing the description includes:
        storing a mask to apply to a field of network data for the each of the subsets of rules and at least one of the subsets of rules includes a plurality of rules that are associated with a same mask.

2. The non-transitory machine-readable medium of claim 1, wherein the network data characteristic includes an address range, the address range includes an address field and a mask, and each rule of a subsets includes an address range.

3. The non-transitory machine-readable medium of claim 2, wherein converting the access control list into the subsets of rules includes grouping access control entries of the access control list into subsets, each subset associated with a single mask.

4. The non-transitory machine-readable medium of claim 3, wherein converting the access control list comprises reducing a number of unique masks in the access control list by transforming the list of access control entries into a transformed list of access control entries.

5. The non-transitory machine-readable medium of claim 4, wherein the transformed list of access control entries is generated using a prefix-preserving transformation or a semantics preserving transformation.

6. The non-transitory machine-readable medium of claim 4, the instructions to cause additional operations comprising evaluating network data using the transformed list of access control entries.

7. The non-transitory machine-readable medium of claim 6, wherein evaluating the network data using the transformed list of access control entries includes transforming the network data and evaluating the transformed network data using the transformed list of access control entries.

8. The non-transitory machine-readable medium of claim 7, wherein evaluating the transformed network data using the transformed list of access control entries has a same result as evaluating the network data using the list of access control entries without transformation.

9. The non-transitory machine-readable medium of claim 7, wherein transforming the address field creates a transformed address field representing one of a source address, a destination address, and source and destination ports.

10. The non-transitory machine-readable medium of claim 1, wherein converting the access control list comprises subdividing address ranges of the access control list such that address ranges do not overlap unless an address range is fully nested within another address range.

11. The non-transitory machine-readable medium of claim 1, wherein storing a description of each of the subsets of rules includes storing an identifier for a hash table, and information to interpret contents of the hash table, wherein the hash table stores multiple groupings of data.

12. The non-transitory machine-readable medium of claim 11, wherein the information to interpret the contents of the hash table includes a number of entries stored in each grouping of data in the hash table and a mapping of data in each entry into a flow label associated with network data.

13. The non-transitory machine-readable medium of claim 1, wherein storing a description of each of the subsets of rules includes storing an identifier of a direct-indexed table, and information to interpret contents of the direct indexed table, wherein the direct indexed table stores one grouping of data.

14. The non-transitory machine-readable medium of claim 13, wherein the one grouping of data includes one or more flow labels and associated results, the one or more flow labels to be compared against masked network data, the associated results including a sequence number associated with each rule in the subsets of rules.

15. The non-transitory machine-readable medium of claim 14, the instructions to cause additional operations comprising selecting the entry from the direct-indexed table using at least a portion of one of the fields of network data as an index into the table.

16. The non-transitory machine-readable medium of claim 1, wherein each rule in a subset of rules is selected from the group consisting of a permit rule and a deny rule, wherein the permit rule includes an address range associated with network data to be forwarded by a network element and the deny rule includes the address range associated with network data to be dropped by the network element.

17. The non-transitory machine-readable medium of claim 16, wherein the address range is a range of layer 2 addresses, layer 3 addresses or layer 4 addresses.

18. A method to convert an ordered access control list into a set of contiguous subsections of access control entries, the method comprising:
    receiving an access control list of access control entries, wherein each of the access control entries includes a network data characteristic and an action;
    converting the access control list into subsets of rules, wherein each rule of one of the subsets of rules is mutually exclusive of each other rule in the subset of rules to allow matching without ordering of the rules; and
    storing a description of each of the subsets of rules, wherein the subsets of rules are used by a network element to make forwarding decisions for the network data, the storing the description includes:
    storing a mask to apply to a field of network data for the each of the subsets of rules and at least one of the subsets of rules includes a plurality of rules that are associated with a same mask.

19. The method of claim 18, wherein the network data characteristic includes an address range, the address range includes an address field and a mask, and each rule of a subset of rules includes an address range.

20. The method of claim 18, additionally comprising reducing a number of unique masks in the access control list by transforming the address field using a prefix-preserving transformation or transforming the access control entries using a semantics-preserving transformation.

21. The method of claim 20, the additionally comprising evaluating network data using a transformed list of access control entries, wherein evaluating the network data using the transformed list of access control entries includes transforming the network data and evaluating the transformed network data using the transformed list of access control entries.

22. The method of claim 21, wherein evaluating the transformed network data using the transformed list of access control entries has a same result as evaluating the network data using the list of access control entries without transformation.

23. The method of claim 18, wherein the description of each subset of rules includes an address field, a pointer to a hash table, and information to interpret contents of the hash table, the hash table storing multiple groupings of data, wherein the information to interpret the contents of the hash table includes a number of entries stored in each grouping of data in the hash table and a mapping of data in each entry into a flow label associated with network data.

24. The method of claim 18, wherein storing a description of each of subsets of rules includes storing a mask to apply to a field of network data, an identifier of a direct-indexed table, and information to interpret contents of the direct indexed table, wherein the direct indexed table stores one grouping of data.

25. The method of claim 24, wherein the one grouping of data includes one or more flow labels and associated results, the one or more flow labels to be compared against masked network data, the associated results including a sequence number associated with each rule in the subsets of rules.

26. The method of claim 25, additionally comprising selecting the entry from the direct-indexed table using at least a portion of one of the fields of network data as an index into the table.

27. The method of claim 18, wherein each rule in a subset of rules is selected from the group consisting of a permit rule and a deny rule, wherein the permit rule includes an address range associated with network data to be forwarded by the network element and the deny rule includes the address range associated with network data to be dropped by the network element.

28. The method of claim 27, wherein the address range is a range of layer 2 addresses, layer 3 addresses, or layer 4 addresses.

29. A network element including:
an access control list processing module to process an access control list associated of the network element, the access control list processing module to convert the access control list into subsets of rules, each rule of one of the subset of rules mutually exclusive of each other rule in the subset of rules to allow matching without ordering of the rules and at least one of the subsets of rules includes a plurality of rules that are associated with a same mask; and
a data plane to make forwarding decisions for network data received via a port of the network element using the subsets of rules.

30. The network element of claim 29, wherein each rule of a subsection is selected from a group comprising a permit rule and a deny rule.

31. The network element of claim 29, wherein the data plane is to identify whether a matching rule in a subset of rules exists and determine if a selected field in a unit of network data matches any rule in the subset of rules.

32. The network element of claim 31, wherein the data plane is to perform an operation on a unit of network data based on a first subset of rules producing a matching rule.

33. The network element of claim 31, wherein the data plane is to perform an operation on a unit of network data based on a one of multiple matching rules, the operation performed based on a comparison of sequence numbers of the multiple matching rules.

34. The network element of claim 29, wherein to evaluate each rule in a subset of rules includes to transform network data to be evaluated based on a transform applied to each rule, wherein the transform applied to each rule is a semantics preserving transformation.

35. The network element of claim 29, wherein the access control list is associated with the port of the network element.

36. A network processing system including:
memory to store a processed access control list, the processed access control list including subsets of rules, each rule of one of the subset of rules mutually exclusive of each other rule in the subset of rules to allow matching without ordering of the rules and at least one of the subsets of rules includes a plurality of rules that are associated with a same mask;
a hardware hash table to store hash values associated with each rule of the subset of rules; and
one or more processors to apply a transformed access control list to network data within a network element, the processors including logic to load a description of a subset of rules of the processed access control list and evaluate each rule in the subset of rules by performing a lookup in the hardware hash table for a hash of a masked flow label associated with the network data.

37. The network processing system as in claim 36, wherein the one or more processors are additionally to derive a flow label associated with the network data based on one or more characteristics of the network data.

38. The network processing system as in claim 36, to derive the flow label associated with the network data, the one or more processors are to determine a transform applied to the rules of the subset of rules and apply the transform to characteristics of the network data used to derive the flow label.

39. The network processing system as in claim 36, wherein the one or more processors, in response to locating a match in the hardware hash table, are to perform an action on the network data, the action specified by the rule associated with the match.

40. The network processing system as in claim 39, wherein the action includes to permit the network data, deny the network data, set a traffic class for the network data, or set a next hop for the network data.

41. The network processing system as in claim 39, wherein the action includes to increment a counter, apply a policer, or apply a load balancing vector.

* * * * *